United States Patent [19]

Yamauchi et al.

[11] Patent Number: 4,995,367

[45] Date of Patent: Feb. 26, 1991

[54] SYSTEM AND METHOD OF CONTROL OF INTERNAL COMBUSTION ENGINE USING METHANE FUEL MIXTURE

[75] Inventors: Teruo Yamauchi, Farmington Hills, Mich.; Akao Sasayama, Bronxville, N.Y.

[73] Assignee: Hitachi America, Ltd., Tarrytown, N.Y.

[21] Appl. No.: 545,711

[22] Filed: Jun. 29, 1990

[51] Int. Cl.$^5$ .................................. F02B 75/12
[52] U.S. Cl. .................................. 123/494; 123/1 A; 123/575; 73/116
[58] Field of Search .................. 123/1 A, 494; 73/116

[56] References Cited

U.S. PATENT DOCUMENTS

| | | | |
|---|---|---|---|
| 4,509,464 | 4/1985 | Hansen | 123/1 A |
| 4,546,732 | 10/1985 | Mae et al. | 123/575 |
| 4,646,691 | 3/1987 | Kiyota et al. | 123/179 G |
| 4,770,129 | 9/1988 | Miyata et al. | 123/1 A |
| 4,905,655 | 4/1990 | Maekawa | 123/494 |
| 4,913,099 | 4/1990 | Ota | 123/494 |
| 4,942,848 | 7/1990 | Terasuka | 123/1 A |
| 4,945,863 | 8/1990 | Schmitz et al. | 123/494 |
| 4,945,880 | 8/1990 | Gonze et al. | 123/478 |
| 4,945,881 | 8/1990 | Gonze et al. | 123/486 |

*Primary Examiner*—E. Rollins Cross

*Attorney, Agent, or Firm*—Antonelli, Terry, Stout & Kraus

[57] ABSTRACT

In controlling fuel injection and ignition timing in an internal combustion engine operating on a fuel mixture, such as gasoline and methanol, consideration must be given to the mixture ratio of the fuel mixture in determining air/fuel ratio and ignition timing, as well as in controlling the atomizing of the injected fuel. Fuel injection time is determined in accordance with air/fuel ratio, which is calculated in accordance with the expression $$A/F = 14.8 - 0.0853P$$

for a fuel mixture of gasoline and methanol, where P is the mixture ratio of methanol. In addition, to enhance cold start performance, a droplet size of injected fuel below $100\mu$ is desired, and this may be achieved using a heating element whose surface temperature is controlled in accordance with the mixture ratio P or by injecting compressed air with the injected fuel in an amount determined by the mixture ratio P, or both. In the alternative, an ultrasonic fuel injector may be employed whose frequency is controlled in accordance with the mixture ratio P.

32 Claims, 7 Drawing Sheets

SYSTEM AND METHOD OF CONTROL OF INTERNAL COMBUSTION ENGINE USING METHANE FUEL MIXTURE

BACKGROUND OF THE INVENTION

The present invention relates in general to internal combustion engines, and more particularly to the control of fuel injection and ignition timing in an internal combustion engine operating on a fuel mixture of gasoline and methanol.

In an effort to protect the environment and conserve fuel sources, efforts have been made to improve the efficiency of operation of internal combustion engines. However, recent regulations which are directed to reduction of NO in exhaust gas seem to require measures which tend to conflict with efficient engine operation, since increase in efficiency of engine operation tends to result in an increase in NO in the exhaust gas.

It is known that, to decrease NO in the exhaust gas of an internal combustion engine, it is necessary only to maintain the maximum temperature of cylinder combustion to less than 1600° C. The two ways of improving heat efficiency are to lower exhaust gas heat and reduce engine friction.

One easy method to address this problem is to use an EGR (exhaust gas recycle) method, which is a known way to reduce NO in exhaust gas. However, the EGR method has several drawbacks, including an increase in the HC and CO levels in the exhaust gas, as well as contamination of the injection port with dust carried in the EGR gas.

Another method of reducing NO in the exhaust gas of an internal combustion engine is to use an alternative fuel, such as methanol mixed gasoline. In this regard, because of its chemical nature, methanol has a lower combustion temperature than gasoline. Thus, using a methanol-gasoline mixture provides for a reduced temperature of cylinder combustion and a consequent reduction in NO in the exhaust gas, but without increasing the levels of HC and CO, as occurs in EGR systems.

Much experimentation has been directed to the use of methanol mixed gasoline in conventional internal combustion engines, but major problems still block the widespread use of this alternative fuel. One of these problems relates to the fact that it is very difficult to start an engine on a methanol-gasoline mixture when the temperature is below 45° F. One proposed solution to the cold-starting problem involves the use of gasoline from an auxiliary tank during starting and warm-up, with a switch being made to the methanol-gas mixture after the engine is warmed up. However, this solution is too costly and ineffective in controlling emissions.

Another problem with the use of methanol mixed gasoline is the difficulty in obtaining maximum torque during warm-up. Known engine control systems for methanol engines control the ignition timing on the basis of the detected methanol-gasoline mixture being burned, but no attention has been given to the need to also control the fuel injection volume to achieve maximum torque, depending on the methanol-gasoline mixture.

SUMMARY OF THE INVENTION

It is a primary object of the present invention to provide for control of the volume of fuel injection and of ignition timing in an internal combustion engine operating on a fuel mixture of gasoline and methanol in such a way as to achieve high fuel efficiency and reduction in exhaust gas emission.

It is a further object of the present invention to determine an air/fuel ratio and control the ignition timing for the internal combustion engine operating on a fuel mixture of gasoline and methanol so as to provide for maximum torque during various operating conditions of the engine.

It is another object of the present invention to provide improved cold start operation of an internal combustion engine operating on a fuel mixture of gasoline and methanol.

It is still another object of the present invention to provide for reduction in NO in the exhaust gas of an internal combustion engine without consequent increase in the levels of HC an CO by operating the internal combustion engine on a fuel mixture of gasoline and methanol, while also achieving high fuel efficiency and improved cold start characteristics.

The foregoing objects are achieved in accordance with one feature of the present invention by determining the air/fuel ratio (A/F) on the basis of the detected mixing ratio P of methanol to gasoline in the fuel mixture used to operate the internal combustion engine. For this purpose, a fuel sensor is employed to detect the percentage of methanol in the fuel mixture, and this mixing ratio P is employed not only in determing the air/fuel ratio, but also in controlling the advance of ignition timing, to provide for fuel efficiency, reduction of ignition gas emission and maximum torque characteristics during various operating conditions of the engine.

More particularly, in contrast to prior art systems in which a fuel mixture is employed in operation of the internal combustion enginge, and in which the fuel injection volume is determined directly from the mixing ratio of methanol and gasoline, the present invention determines air/fuel ratio on the basis of a relationship representing the quantity of air required for complete combustion of the fuel mixture. Thus, when the percentage of methanol in the fuel mixture is P percent, the theoretical air/fuel ratio is determined to be 14.58−0.0853P.

According to a further feature of the present invention, the ignition timing is also controlled in accordance with the percentage of methanol in the fuel mixture. In this regard, the greater the increase in the percentage of methanol in the fuel mixture, the more the ignition timing must be delayed to achieve efficient engine operation. Thus, on the basis of the detected methanol mixing ratio, a particular ignition timing shift is obtained from a map in memory for control of the ignition timing, so that maximum torque is achieved during various operating conditions of the engine.

One of the relevant considerations in the cold start and warming-up operations of an internal combustion engine is the particle size of the injected fuel. When the internal combustion engine is operated on a fuel mixture of gasoline and methanol, the mean particle size becomes particularly critical in the cold start operation as well as during warm up, and it has been determined that the presence of the methanol in the fuel magnifies these problems beyond the level experienced with pure gasoline. Accordingly, it is a further feature of the present invention to employ the use of a heating plate in the intake pipe immediately downstream of the fuel injector to aid in atomizing the fuel being sprayed toward the engine cylinder so as to reduce the particle size to levels which significantly improve the cold start characteristics of an engine operating on a fuel mixture of gasoline and methanol. During warming-up operations, an air atomizing system may be employed to assist the atomizing of the fuel injected by the fuel injector and significantly reduce the particle size of the injected fuel.

During transient conditions in the operation of the internal combustion engine using a fuel mixture of gasoline and methanol, it is possible to employ both the heating plate and the air atomizing system in combination to reduce the particle size of the fuel being injected. In the alternative, an ultrasonic fuel injector may be employed during such transient conditions, as well as during cold start and warming-up operations. Thus, by employing the various features of the present invention individually or in combination, it is possible to provide operation of an internal combustion engine on a mixture of gasoline and methanol with improved cold start characteristics, while achieving a reduction in exhaust gas emission and increased fuel efficiency.

These and other objects, features and advantages of the present invention will become more apparent from the following detailed description of a preferred embodiment, taken in conjunction with the accompanying drawings.

DESCRIPTION OF THE PREFERRED EMBODIMENTS

In the following, a fuel supply and ignition control apparatus according to an embodiment of the present invention will be described, referring to the accompanying drawings.

Figure 1:
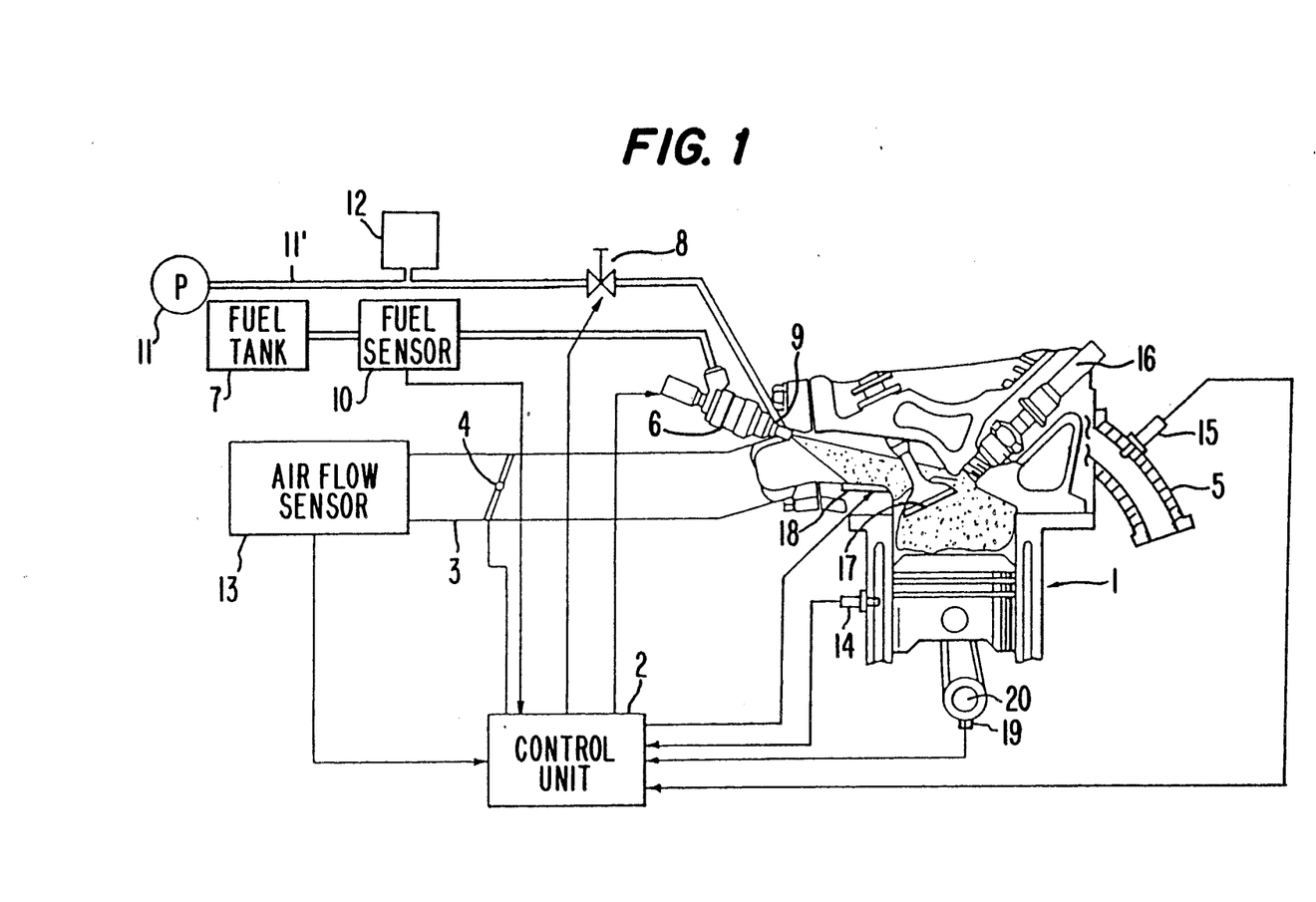
FIG. 1 is a schematic diagram of an engine control system embodying the features of the present invention.

FIG. 1 of the accompanying drawings schematically shows an example of an internal combustion engine control system, to which the features of the present invention are applied. As apparent from the figure, internal combustion engine 1 has a known structure, i.e., it is coupled with an intake pipe 3 for supplying intake air to the cylinders of the engine 1 and an exhaust pipe 5 for discharging exhaust gas from the engine 1.

The intake pipe 3 is provided with a fuel injector 6, which injects a predetermined amount of fuel supplied from a fuel tank 7 into the intake pipe 3 adjacent intake valve 17 in response to an injection pulse signal applied thereto, whereby a fuel mixture of a predetermined air/fuel (A/F) ratio is supplied to the engine 1. There is further provided a throttle valve 4 in the intake pipe 3, which controls the amount of intake air. The opening of the throttle valve 4 is detected by an opening sensor (not shown). Moreover, an air flow sensor 13 for detecting the quantity Q of the intake air is mounted in the intake pipe 3. A spark plug 16, provided in each cylinder to ignite the fuel mixture, is controlled to provide a predetermined ignition timing.

The exhaust pipe 5 is provided with an oxygen sensor 15, which detects the concentration of residual oxygen included in the exhaust gas discharged from the engine 1 and produces a signal representative of the actual A/F ratio of the mixture supplied to the engine 1.

On a cylinder block of the engine 1, there is installed a temperature sensor 14 for detecting the temperature of the cooling water of the engine 1. In the engine 1, there is further provided a crank angle sensor 19, associated with the crank shaft 20 of the engine 1 for detecting the rotation of the crank shaft and the upper dead points (TDC) of respective cylinders of the engine 1 to produce corresponding signals, including the speed of rotation (RPM) of the engine.

Output signals of the aforesaid sensors are coupled to a control unit 21. As already known, the control unit 21 includes a microprocessor and executes a predetermined data processing on the basis of the received signals under control of a stored program. Generally, this data processing is carried on as follows, although details thereof will be understood by those of skill in this art.

An amount of intake air of the engine 1 is at first calculated on the basis of the engine rotational speed, which is obtained from the crank angle signal outputted by the sensor 19, and the output signal from the air flow sensor 13. An amount of fuel to be injected is determined in response to the calculated intake air amount and the rotational speed of the engine. Further, the thus obtained fuel amount is corrected on the basis of an A/F ratio signal fed back from the sensor 15 to determine a final amount of fuel to be injected.

A pulse signal having a pulse width corresponding to the final amount of fuel to be injected is formed as an injection pulse signal, which actuates the injector 7 and causes it to inject a predetermined amount of fuel.

Figure 2:
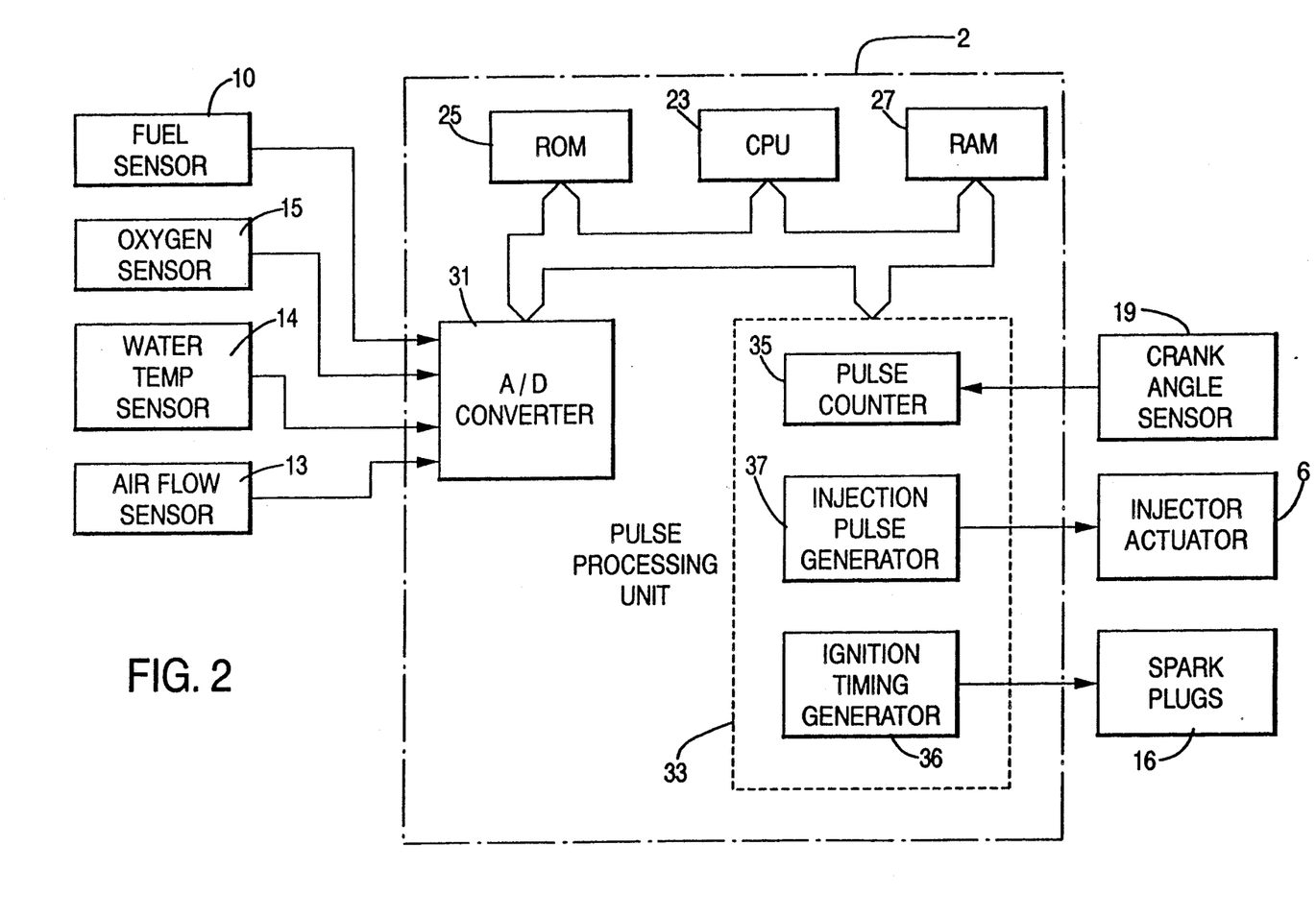
FIG. 2 is a schematic block diagram of a control unit as employed in the engine control system of FIG. 1.

FIG. 2 is a block diagram schematically showing details of the control unit 21. As apparent from the figure, the control unit 21 includes a microprocessor composed of a central processing unit (CPU) 23 for executing a predetermined data processing, a read-only memory (ROM) 25 for storing programs to be executed by the CPU 23 for the predetermined data processing and various constants necessary for execution of the programs, and a random access memory (RAM) 27 for storing data to be processed by the CPU 23 and processed results obtained during execution of the programs.

The CPU 23, ROM 25 and RAM 27 are coupled with each other by common bus 29. Further, analog to digital (A/D) converter 31 is coupled to the common bus 29. The A/D converter 31 receives analog signals outputted by the various sensors and converts them into digital signals. Furthermore, pulse processing unit 33 is coupled to the common bus 29, and includes a pulse counter 35 for counting pulses produced by the crank angle sensor 19 to detect the rotational speed of the engine 1, an injection pulse generator 37 for generating an injection pulse signal to operate the injector 6 and an ignition timing generator 36 for generating an ignition signal to actuate the spark plugs 16 on the basis of the result of processing by the microprocessor.

There is provided a power source for supplying an electric power to all the components described above; however, it is omitted in the figure. Further, although the system first activated by the power source when a starter key switch of the engine 1 is turned on, a part of the RAM 27 is provided with backup electric power and always is supplied with electric power whether the switch is turned on or not. Therefore, the contents of the backed-up portion of the RAM 27 are preserved, even if the starter key switch is turned off.

For purposes of improving the cold start characteristics of an internal combustion engine and to provide maximum torque during warm-up when the engine is operating on a fuel mixture of gasoline and methanol, various additional elements are provided in the engine control system to achieve the objects of the present invention.

First of all, as will be described in more detail hereinafter, proper control of the air/fuel ratio (A/F) during cold start as well as normal running depends on the mixture ratio of methanol and gasoline. For this purpose, a fuel sensor 10 is provided in the fuel line from the fuel tank 7 and the fuel injector 6 for providing a signal to the control unit 2 representing the mixture ratio P of methanol to gasoline. This mixture ratio P will also be used in controlling the ignition timing and other elements of the control systems.

Figure 3:
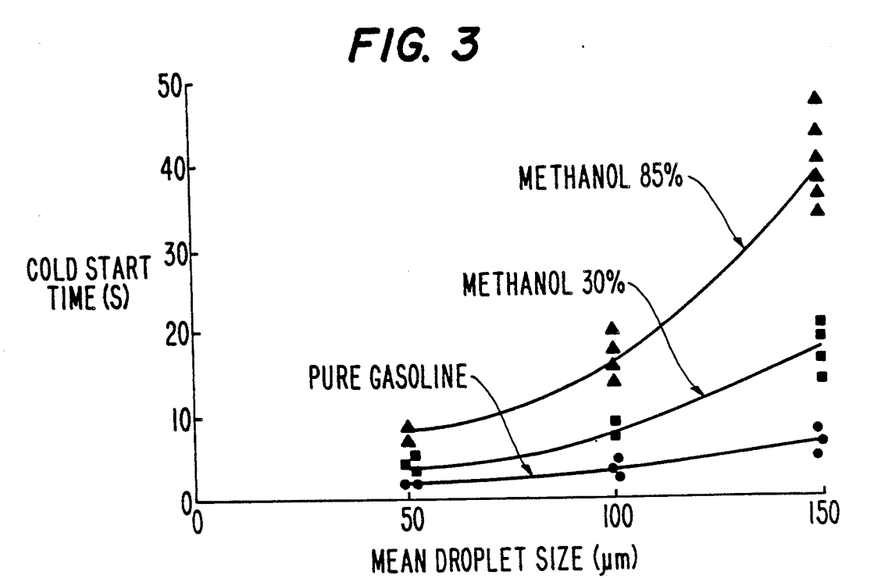
FIG. 3 is a diagram illustrating the relationship between mean droplet size and cold start time for different fuels.

Further, to improve the cold start and warming-up characteristics of the engine, it is important to reduce the particle size of the fuel being injected into each cylinder. In this regard, FIG. 3 shows the relation between the fuel atomizing level and the cold start performance for pure gasoline, for a 30% mixture of methanol and for an 85% mixture of methanol. It can be seen from FIG. 3 that with the addition of methanol to the fuel, the cold start time greatlyl increases for fuel atomizing levels above 100 $\mu$m. Thus, if methanol is to be used, it is important to reduce the mean droplet size of the injected fuel to level below 100 $\mu$m.

Various expedients may be employed to reduce the mean droplet size. One of these is the provision of a heating plate 17 in the intake pipe 3 upstream of the injector 6, so that fuel injected toward the cylinder will be atomized by the plate 17 to reduce the mean particle size. This operation and the manner of its control will be described in more detail later.

A further expedient for reducing the particle size of the fuel in the control apparatus comprises an air atomizing system including an air pump 11, an air pressure accumulator 12, an electromagnetic air valve 8, and an air nozzle 9. These devices operate to inject air, which may be taken in an upper-stream of the throttle valve 4 disposed in the intake manifold 3, through the air nozzle 9 at a predetermined air injection timing synchronized with the fuel injection under control of the control unit 2. The air nozzle may be incorporated into the fuel injector 6 in the manner disclosed in copending U.S. application Ser. No. 430,254, filed Nov. 2, 1989.

Since the air nozzle 9 is arranged in the vicinity of an injecting nozzle of the fuel injected 6, or is integrated therein, this air nozzle 9 operates to blow air against the fuel spray which is injected from the fuel injector 6. When the electromagnetic air valve 8 us opened and then air is injected from the air nozzle 9, this injected air collides with the droplets of the fuel, which are injected from the fuel injector 6, and works to reduce the droplet size of the fuel spray.

Figure 4:
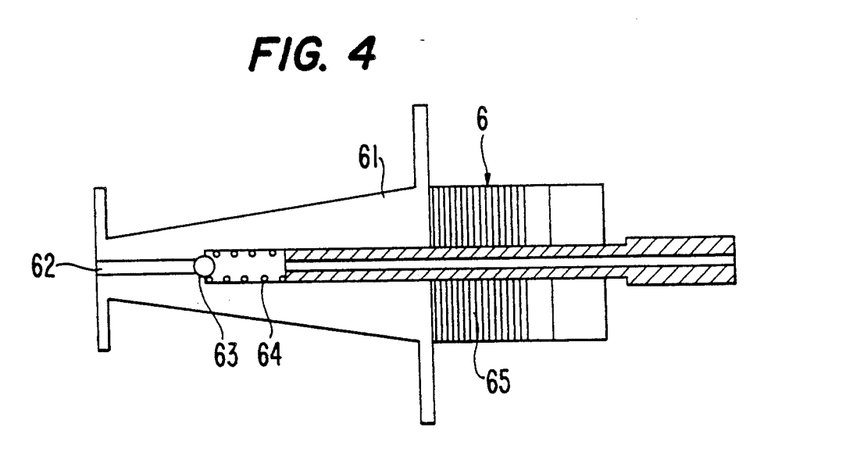
FIG. 4 is a diagram illustrating one example of an ultrasonic fuel injector of the type which may be employed with the present invention.

Another way of achieving increased atomizing of the fuel is through use of a fuel injector in which the droplet size distribution of the gasoline spray may be controlled using a piezoelectric element. An example of such an injector is shown in FIG. 4, and includes a piezoelectric element 65 disposed at one end and a horn portion 61 at the other end with a fuel channel 66 extending therethrough. The channel 66 has a ball valve 63 biased by a spring 64 to control the passage of fuel through a nozzle portion 62, and the ball valve is controlled by vibration of the horn portion 61 when the piezoelectric element is actuated by high frequency pulses.

In the injector of FIG. 4, it is only when the horn portion 61 is subjected to a resonance condition that the fuel will be injected through the nozzle portion 62 and be atomized. Thus, the droplet size can be controlled by driving the horn portion 61 at different multiples of the resonant frequency thereof, for example, at 30 KHz or at 60 KHz. With such an injector, a droplet size as low as about 40 $\mu$m can be obtained. Further examples of this type of fuel injector are disclosed in copending U.S. application Ser. No. 233,038, filed Aug. 17, 1988.

Next, certain basic concepts of the present invention and the features relating to cold start, warming-up and transient operation of the internal combustion engine will be explained in conjunction with the above-described embodiment, for operations of the engine using a mixture of gasoline and methanol.

The theoretical air quantity Ao necessary for complete burning of one kilogram of fuel is expressed by the equation:

$$Ao = 34.34(c/3 + h - (o-s)/8) \text{kg} \quad (1)$$

The symbols c, h, o and s represent the quantities of carbon, hydrogen, oxygen and sulfur contained in one kilogram of fuel. Equation (1) is used to calculate all theoretical air quantities when fuel is burned. First, because the value of $0-s$ is zero, and the ratio of c to h is about 5.8 to 1.0 for standard gasoline on the market, the Equation (1) gives Ao equal to 14.8 for pure gasoline as used in internal combustion engines today. However, when methanol is burned, the ratio of c to h to o is 3:1:4 and so Ao is equal to 6.47.

When the theoretical air quantity Ao is computed for a mixture of gasoline and methanol, attention must be given to the fact that these two fuels do not chemically react with each other. Thus, by maintaining the percentage for each atomic weight, the following values of Ao are obtained:

for a methanol mixture of 15%, Ao=13.47
for a methanol mixture of 30%, Ao=12.30

FIG. 1 shows that an almost linear relationship exists between the percentage of methanol in the mixture and the theoretical air/fuel ratio (A/F). This relationship can be expressed by the equation:

$$(A/F) = 14.8 - 0.0853P \qquad (2)$$

where P relpresents the percentage of methanol in the mixture. By using this equation (2) to determine air/fuel ratio when the internal combustion engine is operating on a mixture of gasoline and methanol, efficient burning of the fuel with a minimum of noxiuos emissions can be achieved for various ratios of the fuel mixture.

An example of the operation of the present invention for controlling fuel injection and ignition timing in an internal combustion engine using a fuel mixture of gasoline and methanol will be described with reference to the flowchart in FIG. 5.

Figure 6A:
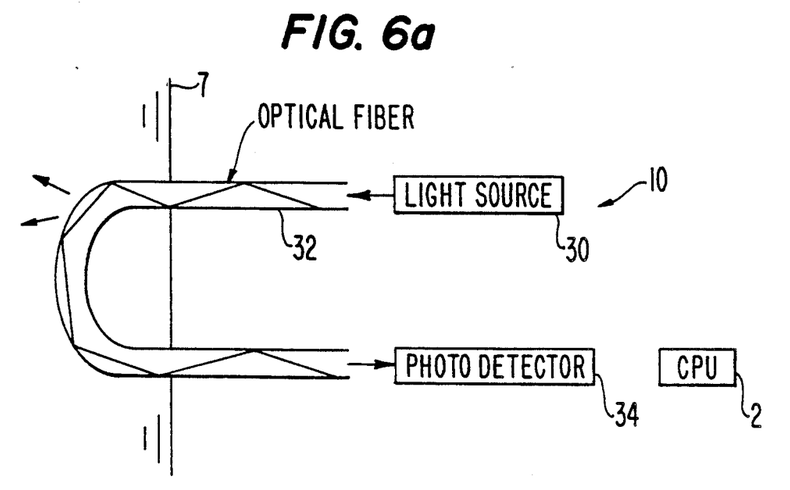
FIG. 6a is a schematic diagram of a fuel sensor of the type which may be employed with the present invention.
Figure 6B:
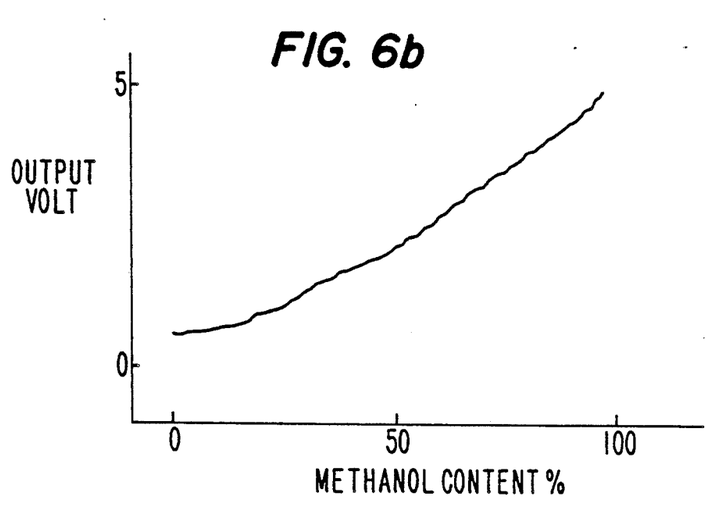
FIG. 6b is a characteristic diagram showing the output of the sensor of FIG. 6a for different values of mixture ratio of methanol.

As indicated above, control of both fuel injection and ignition timing in accordance with the present invention is dependent upon the ratio P of gasoline to methanol in the fuel mixture. Accordingly, the first step of the control process for both ignition timing and fuel injection involves measuring the methanol-gasoline ratio P in step S1. For this purpose, various types of fuel sensors, which may be mounted on the fuel tank or communicate with the fuel line, are known. One type of fuel sensor which may be used in accordance with the present invention is illustrated in FIG. 6a. This fuel sensor operates on optical principles and includes a light source 30 for providing a beam of light to an optical fiber which extends through the fuel tank 7, or the fuel line, and is connected at its opposite end to a photodetector 34 which detects the level of the output light beam. As seen in FIG. 6b, the sensor output level represented by the voltage output of the photodetector 34 increases substantially linearly with increase in the methanol content of the fuel mixture. Accordingly, the output signal from the photodetector 34 to the control unit 2 provides a measure of the methanol content of the fuel.

Figure 5:
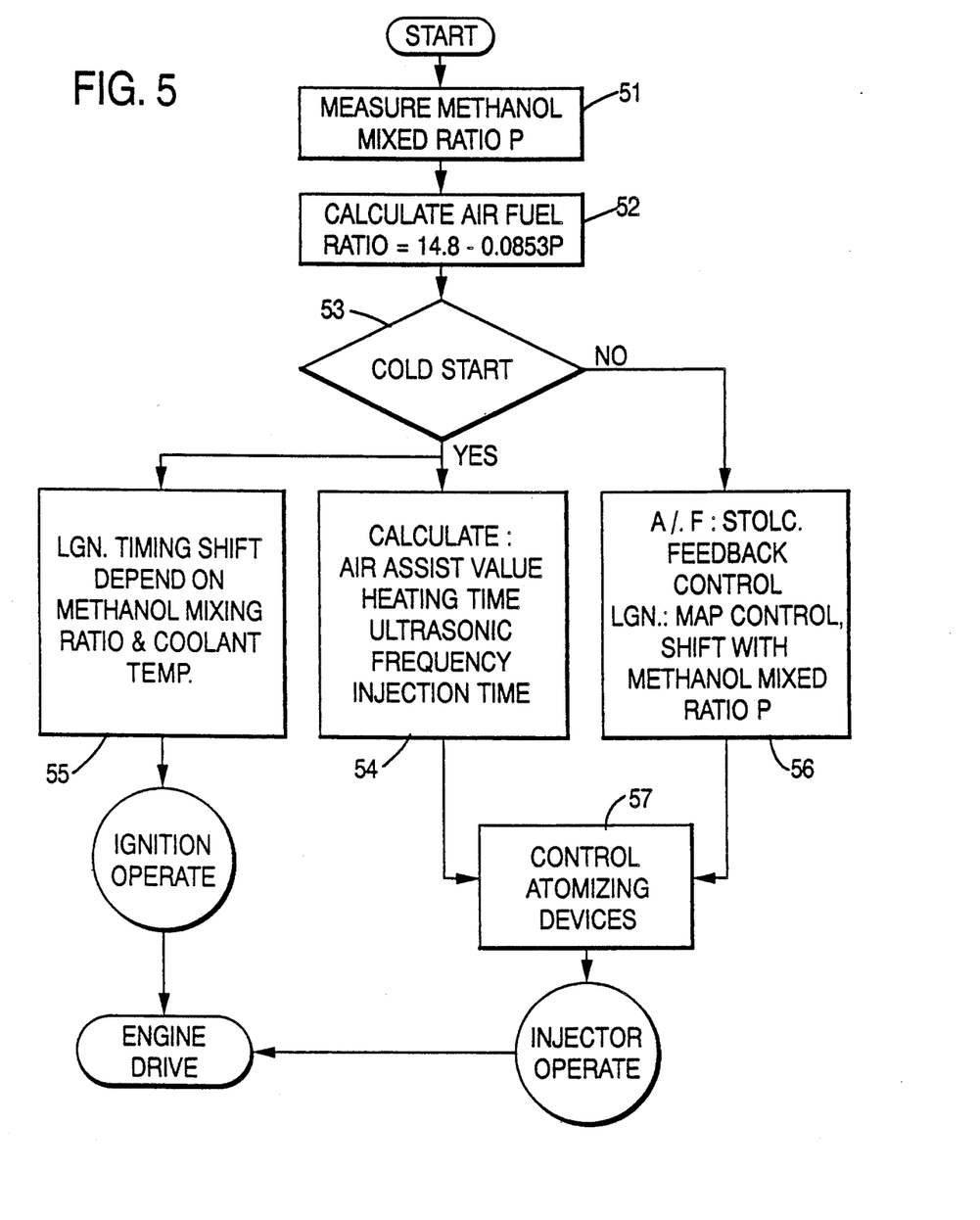
FIG. 5 is a flow diagram which indicates the operations included in the control of an internal combustion engine in accordance with this invention.

In step S2 of FIG. 5, the air/fuel ratio is calculated on the basis of the methanol mixed ratio P determined from the output of the fuel sensor 10 in step S1. This calculation is based on the equation (2) described above to achieve efficient burning of the mixture for various ratios of methanol in the fuel. It will be noted from FIG. 5 that this calculation for air/fuel ratio based on the mixed ratio P of methanol to gasoline in the fuel mixture is employed for all operating conditions of the engine, including cold start, warming-up and steady as well as transient operation. However, in addition to use of this unique relationship for air/fuel ratio when operating the engine with a mixture of methanol and gasoline, other measures are taken in accordance with the present invention to improve cold start characteristics and the warming-up operation.

A. Cold Start Operation

In step S3 of FIG. 5, the control unit 2 determines from the output of the temperature sensor 14 the temperature $T_w$ of the coolant to determine engine temperature. When the output of the angle sensor 19 indicates that the crankshaft is not turning and the output of tyhe temperature sensor 14 indicates a coolant temperature below the first predetermined value, the control unit 2 determines that a cold start condition exists.

Figure 7A:
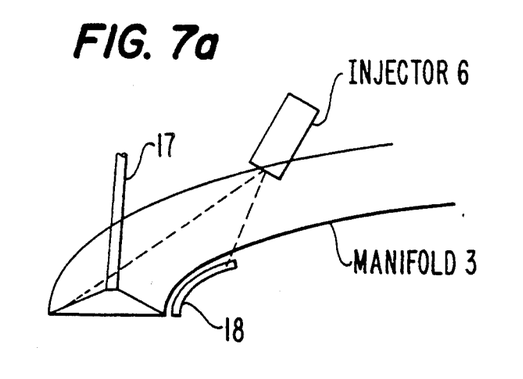
FIG. 7a is a diagram showing fuel injection toward an electronic heating plate disposed in the intake manifold of the internal combustion engine.
Figure 7B:
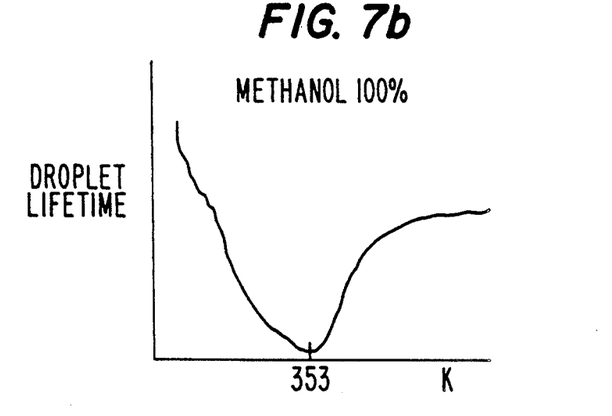
FIGS. 7b and 7c are characteristic diagrams of droplet lifetime for pure methanol and pure gasoline, respectively.
Figure 7C:
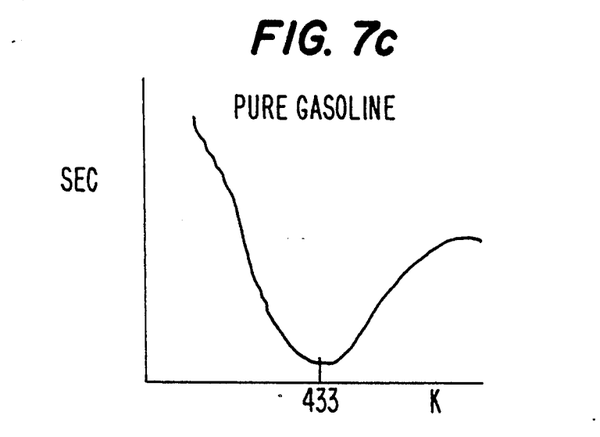
Figure 7D:
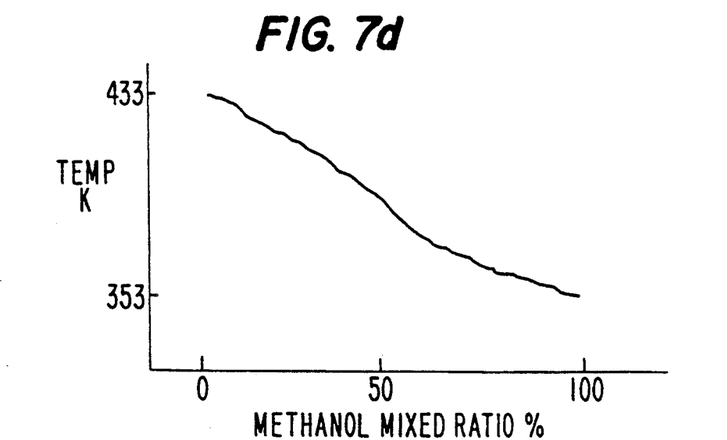
FIG. 7d is a diafram showing the values of temperature of the electric heating plate of FOG. 7a for different values of mixture ratio of methanol.

For a cold start condition, the control unit 2 calculates in step S4 of FIG. 5 a heating time for the electric heating plate 18 to achieve a heating temperature suitable to produce a minimum droplet size for the injected fuel. For this purpose, as see in FIG. 7a, an electric heating plate 18 is disposed immediately upstream of the fuel injector 6 in the manifold 3 and upstream of the intake valve 17 so as to be in the path of the fuel injection spray. By heating the plate 18 to a suitable temperature, the gasoline droplets in the spray are further vaporized to reduce the particle size and thereby improve cold start conditions. However, it has been found in accordance with the present invention that, in order to achieve minimum particle size, it is necessary to contro the surface temperature of the electric heating plate in accordance with the mixed ratio P of methanol to gasoline in the fuel mixture. In this regard, when droplets of fuel are deposited upon a heated surface, the fuel droplets will remain on the surface for a predetermined period of time depending on the temperature of the surface. If the droplets remain on the surface for too long a period of time, inefficient or improper vaporization of the fuel will occur. As seen in FIG. 7b, when the fuel is pure methanol, the droplet lifetime on the heated surface reaches a minimum at 353° K. On the other hand, for pure gasoline, the droplet lifetime reaches a minimum at a higher temperature, i.e. at 433° K. Thus, depending on the mixed ratio P of methanol to gasoline in the fuel mixture, the temperature of the surface of the heating plate which will produce the minimum droplet lifetime will vary. FIG. 7d shows that the variation in the optimum temperature of the surface of the heating plate varies in a substantially linear manner between 353° K. and 433° K. depending upon the percentage of methanol in the Accordingly, during cold start conditions, when the heating plate 18 is employed to achieve a reduction in the particle size of the injected fuel, the control unit 2 will calculate a heating time necessary to achieve a surface temperature for the heating plate 18 according to the mixed ratio P detected by the fuel sensor 10 in accordance with the relationship illustrated in FIG. 7b. In this way, the heating plate 18 is operated at maximum efficiency for vaporization of the injected fuel depending upon the mixed ratio P of methanol to gasoline in the fuel mixture.

If the output of the water temperature sensor 14 indicates to the control unit 2 at the time of engine starting that the temperature of the engine is above the first predetermined temperature, it is possible to use an air assist method to achieve increased atomization of the injected fuel in place of the electric heating plate 18. For this purpose, air from a compressor 11 is supplied on a line 11' to an air nozzle 9 adjacent to, or integrated in, the fuel injector 6 via an accumulator 12 and a solenoid valve 8 controlled by the control unit 2. The compressed air in the line 11', whose pressure is regulated by the accumulator 12, is supplied intermittently in synchronism with fuel injection to the air nozzle 9, and assists in the atomizing of the air particles injected toward the cylinder of the engine. The impact of the compressed air with the injected fuel particles results in a further atomization of these particles to reduce their size to a value which provides more efficient ignition in the engine cylinder. In accordance with the present injvention, the solenoid valve 8 is controlled by the control unit 2 not only to synchronize the blasts of compressed air with the fuel injection, but also controls the valve opening degree in accordance with the mixed ratio P of methanol to gasoline in the fuel mixture as detected by the fuel sensor 10. In this way, maximum efficiency in atomization of the fuel particles using this air assist method for a fuel mixture of methanol and gasoline is achieved in accordance with the present invention.

Figure 8:
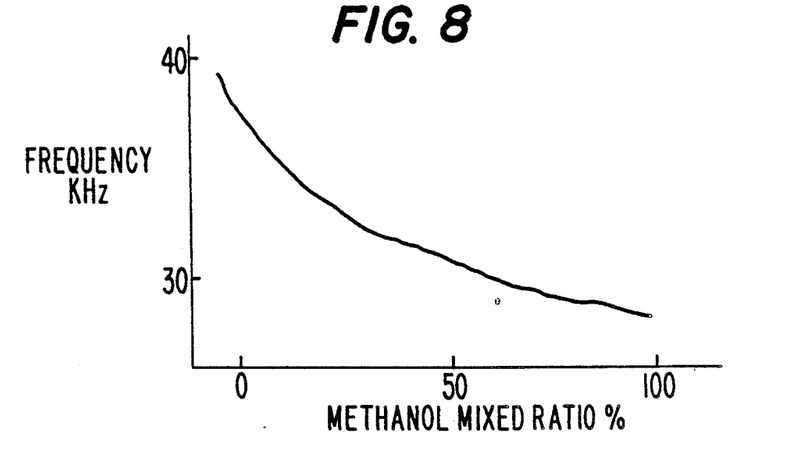
FIG. 8 is a characteristic diagram showing the frequency of a control signal applied to an ultrasonic injector for different values of mixture ratio of methanol.

A further way of achieving reduction in fuel particle size during cold start conditions, both when the engine temperature is below and above the first predetermined engine temperature, is through use of an ultrasonic atomizing method employing a fuel injector of the type illustrated in FIG. 4. For cold start below the first predetermined temperature, it is possible to employ the ultrasonic atomizing method in combination with the electric heating plate 18 to achieve a fine particle size as low as 40 µm, or the ultrasonic atomizing method may be used alone to achieve satisfactory levels of atomization of the fuel particles. One of the advantages of using an ultrasonic fuel injector of the type shown in FIG. 4 is that the droplet size can be controlled by driving the horn portion 61 at different frequencies. This is particularly important when a fuel mixture, such as methanol and gasoline, is employed for the internal combustion engine, since the surface tension of methanol is larger than that of gasoline, so that these fuels do not atomize with the same efficiency. Thus, as seen in FIG. 8, the frequency of the ultrasonic fuel injector is varied in accordance with the present invention between 30 kHz and 40 kHz for different values of methanol mixed ratio P from 0 to 100% to achieve maximum efficiency in the atomization of the fuel mixture.

Figure 9:
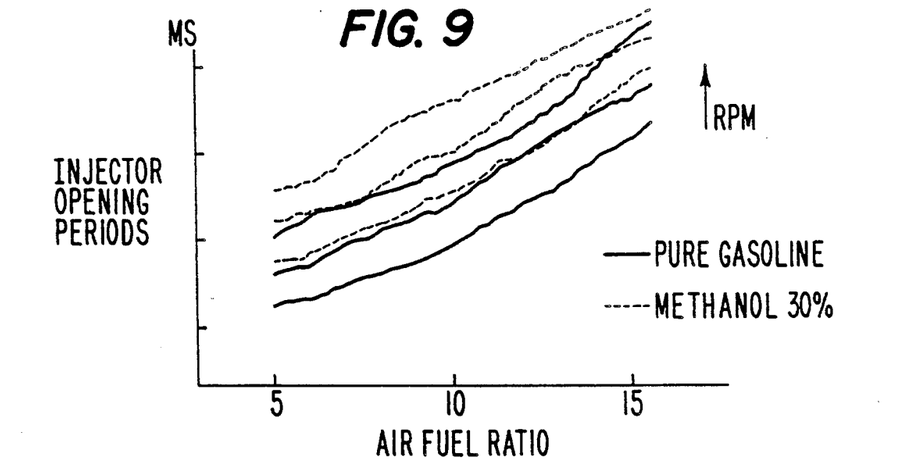
FIG. 9 is a characteristic diagram showing values of injector opening periods for different values of air/fuel ratio.

Finally, injection time is calculated in step S4 during cold start conditions on the basis of the air/fuel ratio calculated in the step S2 of FIG. 5. For this purpose, the control unit 2 accesses a map in memory to obtain values of injector opening period for the calculated value of the air/fuel ratio for different values of engine speed (RPM) calculated on the basis of the output of the angle sensor 19. However, as seen in FIG. 9, values of injector opening period are not only dependent upon air/fuel ratio and engine speed, but also will vary with the variation of methanol mixed ratio P, since the energy supplied by methanol is approximately one-half of that supplied by pure gasoline. Thus, as the ratio of methanol to gasoline increases, tha values for injector opening period for a given air/fuel ratio and engine speed will also increase. FIG. 9 shows examples of values for pure gasoline represented by the solid lines, and for a 30% mixture of gasoline and methanol, represented by the dashed lines. Thus, the control unit 2 in accessing data in the maps stored in memory to calculate injection time will also rely on the output of the fuel sensor 10 to determine the methanol mixed ratio P, along with the calculated air/fuel ratio and measured engine speed to determine injector opening period.

Figure 10:
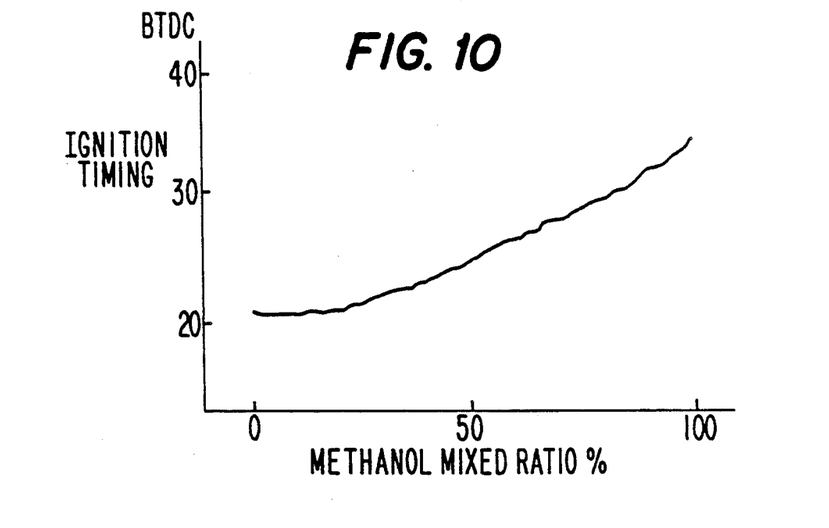
FIG. 10 is a characteristic diagram showing angles of ignition timing advance BTDC for different values of mixture ratio of methanol.

In step S5 of FIG. 5, during cold start operation, the ignition timing will be shifted independence on the methanol mixing ratio and the coolant temperature. As seen in FIG. 10, for a fuel having a large octane value, the ignition timing is advanced from BTDC by an angle between 20° and 40° depending upon the methanol mixed ratio P when the coolant temperature is below the first predetermined value. In this way, spark timing is controlled so as to achieve the best torque characteristics for different values of mixed fuel.

B. Warming Operation of the Engine

Once the engine has been started and is operating during a warming-up period, use of the air atomizing system in which compressed air from the compressor 11 is supplied through the solenoid valve 8 to the air nozzle 9, may be employed to achieve optimum engine operation for efficient fuel consumption and maximum torque characteristics. However, the use of such an air atomizing system may be unnecessary if ultrasonic atomizing of the fuel is achieved by use of an ultrasonic fuel injector of the type described with reference to FIG. 4.

As seen in FIG. 5, during step S6 when the internal combustion engine is operating in an warming-up, steady-running or transient condition, the air/fuel ratio is controlled in accordance with conventional stoichiometric feedback control and ignition timing is shifted in accordance with the methanol mixed ratio P by reference to a map in memory.

In step S7 of FIG. 5, the fuel injectors are controlled in accordance with the values of injection time determined either in step S4 or step S6, and the engine is operated in response to such control to drive the engine.

As can be seen from the foregoing description of the various features of the present invention in cojunction with a preferred embodiment, the control of the volume of fuel injection and of ignition timing in an internal combustion engine operating on a fuel mixture of gasoline and methanol can be provided in such a way as to achieve high fuel efficiency and reduction in exhaust gas emission. In particular, cold start performance of the internal combustion engine using the fuel mixture of methanol and gasoline is enhanced by controlling both fuel injection time and ignition timing on the basis of a detected value of methanol mixed ratio.

In particular, the air/fuel ratio is calculated on the basis of the methanol mixed ratio so as to achieve complete combustion of the fuel and thereby reduce noxious emissions. To enhance cold start operation, various techniques for reducing the particle size of the injected fuel are employed depending on the operating state of the engine, including an electronic heating method, an air assist method and an ultrasonic vaporization method, all of which are controlled on the basis of the detected methanol mixed ratio.

While the foregoing example of the present invention has been described with reference to an internal combustion engine operating on a fuel mixture of methanol and gasoline, it should be appreciated that the principles of the present invention are also applicable to other fuel mixtures, such as gasoline and ethanol, which provides similar advantages in the reductions of NO, while avoiding increase in levels of HC and CO.

Further, it should be appreciated that different combinations of the electronic heating method, air assist method and ultrasonic vibration method of reducing particle size of the injected fuel may be employed for different engine operating conditions and fuel mixtures, and that the present invention is not limited to the specific examples provided in the foregoing detailed description of the preferred embodiment.

While the present invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A system for controlling an internal combustion engine operating on a fuel mixture of gasoline and methanol, comprising:
 a fuel sensor for detecting the mixture ratio (P) of methanol to gasoline in the fuel mixture to be supplied to said internal combustion engine;
 at least one fuel injector for supplying a metered amount of fuel mixture at periodic intervals to a cylinder of said internal combustion engine; and
 a control unit for controlling said fuel injector, including:
 (1) means for calculating an air/fuel ratio (A/F) according to the following relationship:

$$A/F = 14.8 - 0.0853P$$

(2) means for determining a fuel injector opening time period based on said calculated air/fuel ratio; and
 (3) means for periodically actuating said fuel injector based on said determined fuel injector opening time.

2. An internal combustion engine controlling system according to claim 1, further including:
 a crank angle sensor for detecting various angles of rotation of the crank shaft of said internal combustion engine, including a top dead center position; and
 an ignition circuit for ignition the fuel mixture injected by said fuel injector at a calculated ignition timing;
 said control unit further including means for actuating said ignition circuit to effect ignition of said fuel mixture at an angle before top dead center in response to the output of said crank angle sensor, said angle before top dead center being determined on the basis of said mixture ratio (P) detected by said fuel sensor.

3. An internal combustion engine controlling system according to claim 1, wherein said fuel injection is disposed in an intake manifold upstream of a cylinder of said internal combustion engine, and further including:
 a heat element, disposed in said intake manifold downstream of said fuel injector and having a heating surface positioned to intercept at least a portion of the fuel mixture injected by said fuel injector, for atomizing droplets of fuel which come into contact therewith.

4. An internal combustion engine controlling system according to claim 3, wherein said control unit further includes means for controlling the temperature of said heating surface according to the mixture ratio (P) detected by said fuel sensor.

5. An internal combustion engine controlling system according to claim 4, wherein the temperature of said heating surface is controlled to have a temperature between 433° K. and 353° K. for values of mixture ratio (P) of 0–100% methanol.

6. An internal combustion engine controlling system according to claim 3, wherein said fuel injector is an ultrasonic fuel injector capable of controlling the size of the fuel particles injected thereby in response to the frequency of a control signal applied thereto.

7. An internal combustion engine controlling system according to claim 6, wherein said control unit further includes means for generating said control signal with a frequency depending on the mixture ratio (P) detected by said fuel sensor.

8. An internal combustion engine controlling system according to claim 3, further including a compressed air assist system for assisting in the atomizing of the fuel mixture injected by said fuel injector, including a source of compressed air connected to an air nozzle cooperating with said fuel injector to atomize fuel injected toward a cylinder of said internal combustion engine.

9. An internal combustion engine controlling system according to claim 8, wherein said control unit further includes means for synchronizing the application of bursts of compressed air to the injected fuel mixture with actuation of said fuel injector and for controlling the amount of air in each burst according to the mixed ratio (P) detected by said fuel sensor.

10. An internal combustion engine controlling system according to claim 9, wherein said compressed air assist system includes an air conduit connected between said source of compressed air and said air nozzle, a pressure accumulator coupled to said air conduit, and a control valve disposed in said air conduit and controlled by said control unit for controlling the amount of compressed air and the timing of said bursts of compressed air supplied for atomizing said fuel mixture.

11. A system for controlling an internal combustion engine operating on a fuel mixture of gasoline and an alternative fuel, comprising:
 a fuel sensor for detecting the mixture ratio of the alternative fuel to gasoline in the fuel mixture to be supplied to said internal combustion engine;
 a crank angle sensor for detecting various angles of rotation of the crank shaft of said internal combustion engine;
 an ignition circuit for igniting a fuel mixture supplied to a cylinder of said internal combustion engine on the basis of a calculated ignition timing; and
 a control circuit for controlling said ignition circuit, including:
 (1) means responsive to said crank angle sensor for detecting a top dead center position of the crankshaft;
 (2) means responsive to said fuel sensor for generating air ignition signal at an angle before top the dead center position of said crankshaft, which angle depends on said mixture ratio detected by said fuel sensor; and
 (3) means for controlling said ignition circuit using said ignition signal.

12. A system for controlling an internal combustion engine according to claim 11, wherein said alternative fuel is methanol.

13. A system for controlling an internal combustion engine according to claim 11, wherein said alternative fuel is ethanol.

14. A system for controlling an internal combustion engine operating on a fuel mixture of gasoline and an alternative fuel, comprising:
 a fuel sensor for detecting the mixture ratio of the alternative fuel to gasoline in the fuel mixture to be supplied to said internal combustion engine;
 at least one fuel injector disposed in an intake manifold upstream of a cylinder of said internal combustion engine for supplying a metered amount of said fuel mixture at periodic intervals to said cylinder;
 a heating element, disposed in said intake manifold downstream of said fuel injector and having a heating surface positioned to intercept at least a portion of the fuel mixture injected by said fuel injector, for atomizing droplets of fuel which come into contact therewith; and a control unit for controlling said fuel injector and said heating element, including:
(1) means for calculating an air/fuel ratio;
(2) means for determining a fuel injector opening time period based on said calculated air/fuel ratio;
(3) means for periodically actuating said fuel injector based on said determined fuel injector opening time; and
(4) means for controlling the temperature of said heating surface of said heating element according to the mixture ratio detected by said fuel sensor.

15. An internal combustion engine controlling system according to claim 14, wherein the temperature of said heating surface is controlled to have a temperature between 433° K. and 353° K. for values of mixture ratio (P) of 0–100% methanol.

16. An internal combustion engine controlling system according to claim 14, wherein said fuel injector is an ultrasonic fuel injector capable of controlling the size of the fuel particles injected thereby in response to the frequency of a control signal applied thereto.

17. An internal combustion engine controlling system according to claim 16, wherein said control unit further includes means for generating said control signal with a frequency depending on the mixture ratio (P) detected by said fuel sensor.

18. An internal combustion engine controlling system according to claim 14, further including a compressed air assist system for assisting in the atomizing of the fuel mixture injected by said fuel injector, including a source of compressed air connected to an air nozzle cooperating with said fuel injector to atomize fuel injected toward a cylinder of said internal combustion engine.

19. An internal combustion engine controlling system according to claim 18, wherein said control unit further includes means for synchronizing the application of bursts of compressed air to the injected fuel mixture with actuation of said fuel injector and for controlling the amount of air in each burst according to the mixed ratio (P) detected by said fuel sensor.

20. A system for controlling an internal combustion engine according to claim 14, wherein said alternative fuel is methanol.

21. A system for controlling an internal combustion engine according to claim 14, wherein said alternative fuel is ethanol.

22. A system for controlling an internal combustion engine operating on a fuel mixture of gasoline and an alternative fuel, comprising:
a fuel sensor for detecting the mixture ratio of the alternative fuel to gasoline in the fuel mixture to be supplied to said internal combustion engine;
at least one fuel injector for supplying a metered amount of said fuel mixture at periodic intervals to a cylinder of said internal combustion engine, said fuel injector having an ultrasonic element for controlling the size of fuel particles injected by said fuel injector in response to the frequency of a control signal supplied thereto; and
a control unit for controlling said fuel injector, including:
(1) means for calculating an air/fuel ratio;
(2) means for determining a fuel injector opening time period based on said calculated air/fuel ratio;
(3) means for periodically actuating said fuel injector to inject a metered amount of fuel based on said determined fuel injector opening time; and
(4) means for generating a control signal having a frequency depending on the mixture ratio detected by said fuel sensor and for supplying said control signal to the ultrasonic element of said fuel injector.

23. A system for controlling an internal combustion engine according to claim 22, wherein said alternative fuel is methanol.

24. A system for controlling an internal combustion engine according to claim 22, wherein said alternative fuel is ethanol.

25. A method of controlling fuel injection in an internal combustion engine operating on a fuel mixture of methanol and gasoline, comprising the steps of:
detecting the mixture ratio (P) of methanol to gasoline in the fuel mixture to be supplied to the internal combustion engine;
calculating an air/fuel ratio (A/F) according to the following relationship:

$$A/F = 14.8 - 0.0853P$$

determining a fuel injection time period which will result in injection of a metered amount of said fuel mixture using said calculated air/fuel ratio (A/F);
injecting said fuel mixture into said internal combustion engine periodically during periods corresponding to said determined fuel injection time period.

26. A method of controlling fuel injection in an internal combustion engine operating on a fuel mixture of gasoline and an alternative fuel, comprising the steps of:
detecting the mixture ratio of said alternative fuel to gasoline in the fuel mixture to be supplied to the internal combustion engine;
calculating a fuel injection time period during which said fuel mixture is to be periodically injected in said internal combustion engine;
injecting said fuel mixture toward a cylinder in the internal manifold of said internal combustion engine; and
controlling the droplet size of the injected fuel mixture in accordance with the detected mixture ratio of alternative fuel to gasoline in said fuel mixture.

27. A fuel injection controlling method according to claim 26, wherein said step of controlling the droplet size includes heating droplets injected toward said cylinder using a heating element whose surface temperature is controlled in accordance with said detected mixture ratio.

28. A fuel injection controlling method according to claim 26, wherein said step of controlling the droplet size includes directing compressed air in an amount based on said detected mixture ratio against the fuel mixture injected to said cylinder.

29. A fuel injection controlling method according to claim 28, wherein said step of controlling the droplet size further includes heating droplets injected toward said cylinder using a heating element whose surface temperature is controlled in accordance with said detected mixture ratio.

30. A fuel injection controlling method according to claim 26, wherein said step of injection said fuel mixture is carried out using a fuel injector having an ultrasonic element which produces a vibration capable of controlling the droplet size of the injected fuel mixture in response to a control signal of variable frequency, and wherein said step of controlling the droplet size includes controlling the frequency of said control signal in accordance with said detected mixture ratio.

31. A fuel injection controlling method, wherein said alternative fuel is methanol.

32. A fuel injection controlling method, wherein said alternative fuel is ethanol.

* * * * *